United States Patent [19]

Proctor

[11] Patent Number: 4,881,189
[45] Date of Patent: Nov. 14, 1989

[54] COMPUTER ANALYTICAL PROGRAM PROCESS

[76] Inventor: Don R. Proctor, 2700 Carol Dr., Big Spring, Tex. 79720

[21] Appl. No.: 885,667

[22] Filed: Jul. 15, 1986

Related U.S. Application Data

[63] Continuation-in-part of Ser. No. 544,562, Oct. 24, 1983.

[51] Int. Cl.⁴ .............................................. G06F 7/00
[52] U.S. Cl. .............................................. 364/715.05
[58] Field of Search ............... 364/709, 710, 715, 300, 364/401–418, 706, 715.05

[56] References Cited

U.S. PATENT DOCUMENTS

| | | | |
|---|---|---|---|
| 3,801,803 | 4/1974 | McDaniel | 235/310 |
| 4,059,750 | 11/1977 | Dubinson et al. | 364/715 |
| 4,100,602 | 7/1978 | Shapiro | 364/715 |
| 4,107,782 | 8/1978 | Cochran | 364/706 |
| 4,217,653 | 8/1980 | Nakata | 364/715 |
| 4,247,851 | 1/1981 | Hall | 235/310 |
| 4,251,867 | 2/1981 | Uchida et al. | 364/715 |
| 4,290,113 | 9/1981 | Haker et al. | 235/310 |
| 4,319,130 | 3/1982 | Spitzner | 364/709 |
| 4,491,725 | 1/1985 | Pritchard | 364/413 |
| 4,607,332 | 8/1986 | Goldberg | 364/300 |
| 4,636,970 | 1/1987 | Morino et al. | 364/706 |
| 4,667,292 | 5/1987 | Mohlenbrock et al. | 364/413 |
| 4,686,624 | 8/1987 | Blum et al. | 364/413 |
| 4,686,643 | 8/1987 | Ishiwata | 364/715 |

OTHER PUBLICATIONS

TI Programmable 58C/59 Master Library, pp. 84–88, copyright Texas Instruments Inc., 1979.
Series 40 Advanced Programmable Calculators, Hewlett Packard, Oct. 1983.

*Primary Examiner*—David L. Clark
*Assistant Examiner*—Dale M. Shaw

[57] ABSTRACT

A process which allows the entering or retrieval of data without the concern of the units attached to the data. This is achieved by converting the input data into an internal data format, the internal data format having a numeric value and units which are equivalent to the input data. To retrieve data, the user selects the desired units, and the system converts the internal data to the desired units, and then outputs the result.

1 Claim, 2 Drawing Sheets

COMPUTER ANALYTICAL PROGRAM PROCESS

CITED REFERENCES:

| 4,100,602 | 7/11/78  | Shapiro   | 364,715 |
|-----------|----------|-----------|---------|
| 3,801,803 | 4/02/74  | McDaniel  | 235,310 |
| 4,290,113 | 9/15/81  | Haker     | 364,715 |
| 4,059,750 | 11/22/77 | Dickinson | 364,715 |
| 4,251,867 | 2/17/81  | Uchida    | 364,715 |
| 4,319,130 | 3/09/82  | Spitzner  | 364,709 |
| 4,458,325 | 7/03/84  | Nakata    | 364,709 |

FIELD OF THE INVENTION:

The invention to be described is a new, novel, and useful computer analytical program process.

Said process is especially applicable but not limited to the generation of computer analytical software "handbooks" or "reference books".

The designations "handbooks" or "reference books" are used in this patent application to signify analytical data packaged as computer software programs in lieu of conventional book forms.

The invention disclosed herein makes it possible for the user of said analytical software programs to enter and retrieve input/output data without the use of or concern for conversion factor tables or programs, and whether special data factors or multipliers are required, or of their values. Special data factors being indentified as, but not limited to "universal" constants such as charge of an electron, gravitational constants, velocity of light, acceleration of gravity, or gas constants. Multipliers being numbers used to properly relate program prarmeters, i.e. $S = 1 / 2 \times A \times T \times T$.

UNITFACTOR: Nearly all data inputs to analytical work are numbers in terms of their qualifing dimensions (unitfactors). Example, a length may be entered as the numerical value of 3, but unitfactors such as inches, centimeters, miles, or millimeters are necessary to fully define said value.

In this application, the word "unitfactor" will be used to designate parameters such as feet, pounds, square inches, miles per hour, revolutions per minute, and kilowats.

Said invention has been achieved with simplicity suitable for, but not limited to, the individual engineer or scientist having access to a personal, business, educational, or special computer accepting standard software cartridges, disks, or tapes. Special computers could be constructed to utilize the process of this invention with said software internal.

PRIOR ART:

Reference books, hand books, and text books have long been available to engineers and scientists which contain solutions to sundry problems of an analytical nature.

When using the solutions and formulae involved, the user must not only have his input/output data in the correct values for the unitfactors required, but he must know if any "universal" constants or multipliers are required and their values to fit the solutions involved.

Such comments are not directed to specific analyses performed frequently using computers tailored to a single application, but to analytical "handbook" type solutions used by diverse personnel of the many diciplines.

As an example, one wishing the wind loading on a surface, might refer to an age-old standby on aerodynamic forces. Stated, "The relation is usually written;

$$F = C / 2 \times R \times V \times V \times S"$$

Nine pages later, r is given in terms of slugs.

Needless time continues to be lost and untold errors continue to be made by users through lack of knowledge, inadvertant use of, or incorrect conversions of input/output data and any "universal" constants or multipliers involved.

Many computer conversion programs have been written giving conversion factors from one set or system of unitfactors to another, offering said user convenient conversions of his data, although time and errors persist, with the formulae formats.

Referenced patent by Spitzner, details a hand calculator combined with an elaborate conversion factor table, such that the user can call for conversion to specify unitfactors as his formulae are entered and data read out. However, the user must still be cognizant to assure all units entered are compatible with the equations he writes, and further that and values for "universal" constants or multipliers match, not always an easy task, especially for complex analyses.

SUMMARY OF THE INVENTION

To circumvent the problems associated with analytical formulae input/output unitfactors, values for "universal" constants, and multipliers; software programs using the process of the instant invention would be developed with the unitfactors, "universal" constants, and multipliers integrated to each of the program parameters. Subsequently, enabling the user to enter each of his data in alpha/numeric presentation of his choosing, using the said computer keyboard. Sixty miles per hour can be entered as 60,MI/HR, 88,FT/SEC, a metric equivalency or other equivalent designnation opted by the user. As each alpha/numeric data are entered, internal "IF-THEN" program techniques convert the numerical values to said program compatibility. Input entries continue until those, called for by the program, via said computer video or digital presentations, are completed. Before the answer or answers are presented to the user, he is interrogated again by said computer video or digital presentation for the unitfactors or parameters desired. The user's unitfactor responses are entered via said computer keyboard. The output data are then presented as requested, via said computer video, digital, or printer outputs.

The user now has the results of his analytical analysis in the format suited to further persue his field of quest, in less time, and with solutions of greater accuracy.

It is now evident, the user of analytical programs of this invention, need have no knowledge of the unitfactors utilized by the internal program, or of values of any of the "universal" constants or multipliers required. The analytical data injected and the output answers received are of his own choosing. All wasted time and errors associated with such usage are henceforth eliminated.

Figure 1:
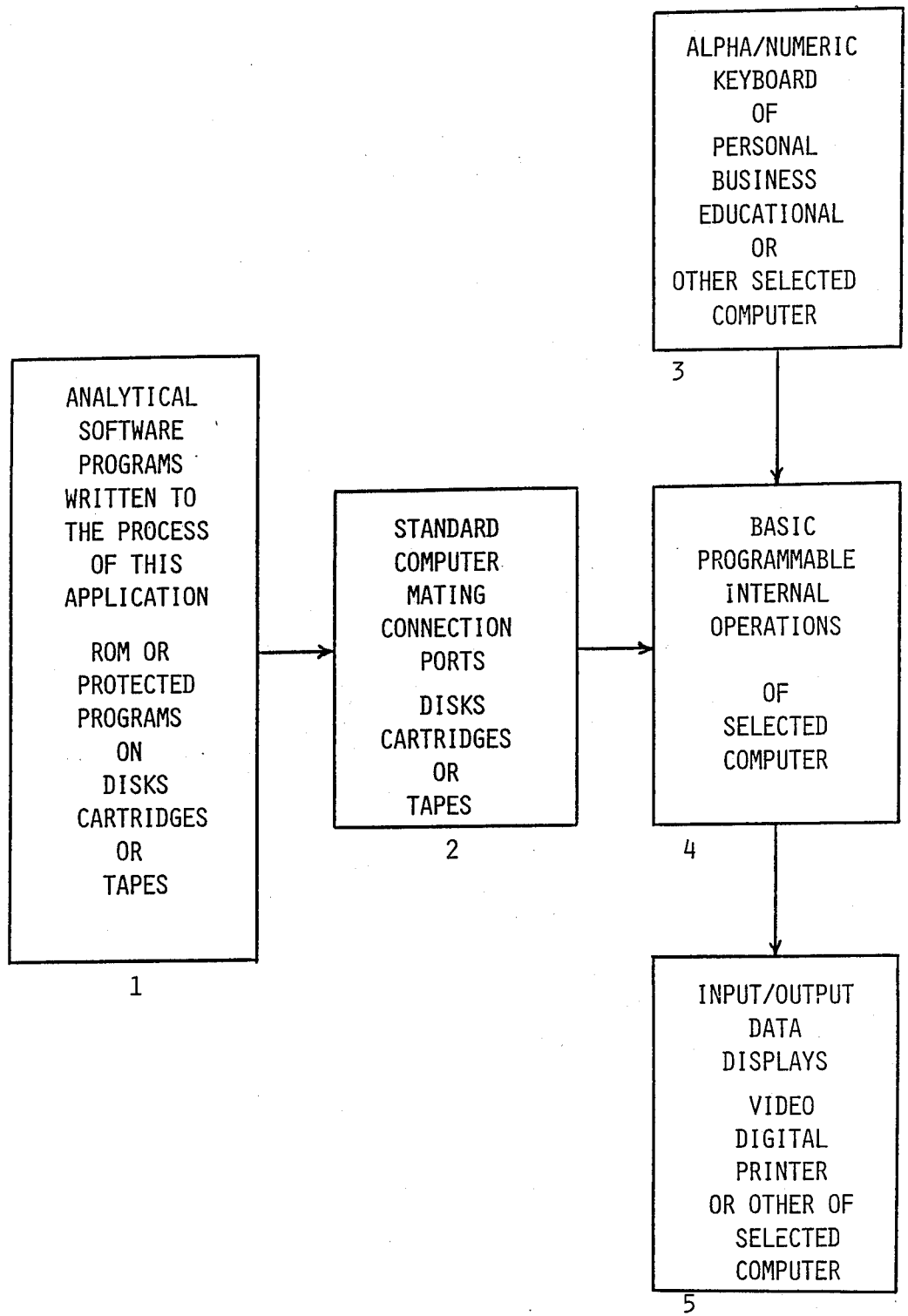
FIG. 1 is a block diagram of the process of this application software used with standard computer components.

DESCRIPTION OF THE PREFERRED EMBODIMENT:

As stated, the process of this patent application permits the generation of unique and valuable analytical software programs for use with sundry personal, business, educational, or special computers.

Analytical programs of the instant invention would be generated by the following, but not limiting, explanatory steps, by analysts skilled in the diciplines.

1. The unitfactors best suited to each dicipline would be selected. In the U.S., certain mechanical engineering dicipline would find inches of length, stress in pounds per square inch, weights in pounds, speed in miles per hour, and densities in cubic feet.

2. Program analytical formulae would be equated to the selected unitfactors as unity values, accepting inches, psi, pounds, mph, and cubic feet.

3. The said program:, "IF-THEN" search technique, would be developed to convert all data inputs to equivalency. Should the user input 3,FT the program formulae would receive 36, as the input value. If 25.4, mm, the numerical value 1 would be returned to the program.

4. Programming for output unitfactors selected by the user, would cause the presented output numerical data to be "IF-THEN", converted from the formulae output unitfactors to those requested. Should the formulae output linear value be one foot, the response to user request of inches would be 12,in.

5. Programming would further necessitate formulating all "universal" constants and multipliers to the selected unitfactors.

6. Each analytical program developed would be placed on software suited to user computer compatability, disks, cartridges or tapes, or internal to a special computer.

An analytical software program using the process of this invention will be described.

The user "LOADS" his selected analysis program of the process of this invention into said computer using disk, cartridge, or tape versions. Once his selected program has been loaded and directed to "RUN", operation is described.

As the computer software program runs, the user will be interrogated on said computer video screen or digital display for each input parameter required by the selected analysis. In response to each parameter request, the numerical value and unitfactor is entered using said computer's alpha/numeric keyboard. After each data input, the software program sends the unitfactor nomenclature to an "IF-THEN" bank which returns the necessary function forcing the numerical input to compatibility with the internal software program and the "universal" constants or multipliers utilized.

When said computer program of this invention is completed the user is interrogated for the unitfactors or the output data, via said computer video or digital displays.

The user selected unitfactor responses are entered by said computer keyboard, and the analysis outputs are presented to the user, via said computer video, digital or printer.

A computer operation is described as it would function with an analytical program developed with the process of this invention. The analysis selected is in the dicipline of centrifugal and centripetal force relationships.

Figure 2:
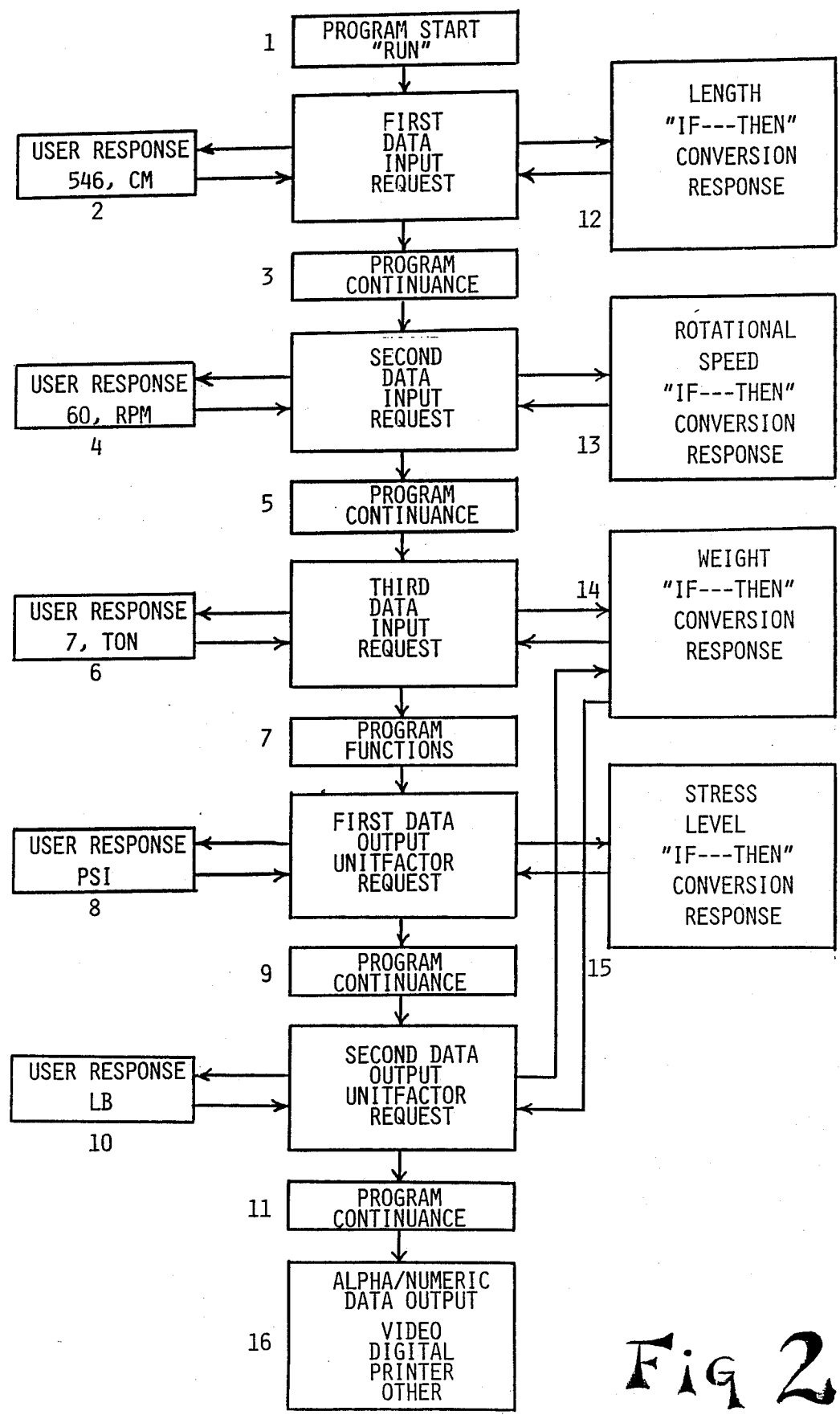
FIG. 2 block diagram of data flow in a program using the process of this application.

Reference, FIG. 2, the first input data request, 2, could be the radius of gyration, and the operator could respond with 546, cm. One program technique detail could be the numeric value "546" entered as a fixed varible such as "L" and the unitfactor "CM" as a string varible, "U$".

The program sub-routine feeds the values for L and U$ to the conversion process section 12, wherein "546" is converted by an "IF-THEN" program technique to the correct unitfactor numeric value required of the specific program involved. If the required unitfactor is feet, L is converted from the numeric value of "546" to "12.913" for feet equivalence. The computer program then assimilates the new value for "L" as feet.

Note . . . standard common abbreviations may be used for the unitfactors, i.e. MM, CM, FT, YD, RPM, TON, GM/CM2, LB/FT3. A numeric value at the end may be used to indicate the Power the latter two then being "grams per square centimeter" and "pounds per cubic foot". Said abbreviations are considered exemplitory and not limiting.

Each conversion uses well-known "IF-THEN" computer programming technique and is made immediately following that data input, freeing the same conversion section for the next data entry, if needed. Sub routine, 4, again sends data to the conversion process, Section 13. Should the unitfactor RPM be entered and should the program unitfactor call for RPM rather than another such as RPH (Revolutions Per Hour), said Conversion Process Section would return the numeric value "60" unaltered.

When said program has received all required input data, it then asks, 8, the operator to specify the output unitfactors desired. Said desired unitfactors being again entered as a string varible U$. At this point, it is disclosed that another feature of the section conversation process is using the same U$ conversion factors for both entry and retrival of like parameter data by use of reciprocals.

In the above process, the operator injected "546,CM" , "60,RPM" and "7,TON" into the same program and asked for the answers in "PSI" and "LB". In doing so, he had no concern for conversion factors, the exact unitfactors required by the internal program, and "universal" constants or multipliers. No "conversion factor" time was required with no probability of errors introduced.

Since each of the internal program unitfactors conversions of a dicipline need to be determined only once for all programs, they can be economically carried out to as many decimal places of accuracy as the intended computer can handle.

The following details said invention analytical program development for the weight for a liquid in a circular tank. The example program writter in typical "basic" home or personal computer logic, typical of Atari, Apple, TRS-80, IBM or other similar computers, but it can be applied equally or even more readily to much more sophisticated or specialized computers.

```
1000 PRINT "WEIGHT OF LIQUID IN CIRCULAR TANK"
1020 PRINT "FOR EACH INPUT DATA, SPECIFY THE
NUMERIC VALUE FOLLOWED BY A COMMA,
THEN THE SELECTED unitfactors, i.e.
3,FT; "3,LB/IN2 etc."
1030 PRINT "DIAMETER OF TANK"; :INPUT D, U$
1040 GOSUB 2000
1050 D=D*J
```

-continued

```
1200 PRINT "HEIGHT OF LIQUID": ;INPUT H,U$
1210 GOSUB 2000
1220 H=H*J
1400 PRINT "DENSITY OF LIQUID": ;INPUT G,U$
1410 GOSUB 2200
1420 G=G*K*1728
1500 W=3.1416*(D/2)2*H*G
1510 PRINT "SPECIFY THE OUTPUT UNITFACTORS
DESIRED"
Note.."the output unitfactors selected do not affect
the input unitfactors entered previously".
1520 PRINT "SELECT UNITFACTORS FOR WEIGHT OF
LIQUID": ;INPUT U$
1530 GOSUB 2400
1540 W=W*MM
1550 PRINT
1560 END
2000 IF U$ = "MM" THEN JJ = 304.8
2010 IF U$ = "CM" THEN JJ = 30.48
2020 IF U$ = "MTR" THEN JJ = 0.3048
2030 IF U$ = "KM" THEN JJ = 0.0003048
2040 IF U$ = "IN" THEN JJ = 12
2050 IF U$ = "FT" THEN JJ = 1
2060 IF U$ = "MI" THEN JJ = 1/5280
2070 J = 1/JJ
2080 RETURN
2200 IF U$ = "LB/IN3" THEN KK = 1
2210 IF U$ = "LB/FT3" THEN KK = 1728
2220 IF U$ = "LB/GAL" THEN KK = 29.922078
2230 IF U$ = "GM/CM3" THEN KK = 27.679905
2240 IF U$ = "GM/LTR" THEN KK = 27680.68
2250 IF U$ = "MG/MTR3" THEN KK = 27679.905
2260 IF U$ = "OZ/QT" THEN KK = 119.688312
2270 IF U$ = "SLG/FT3" THEN KK = 53.707963
2280 K=1/KK
2290 RETURN
2400 IF U$ = "MG" THEN MM = 452492.37
2410 IF U$ = "GM" THEN MM = 453.59237
2420 IF U$ = "KG" THEN MM = 0.45359237
2430 IF U$ = "OZ" THEN MM = 16
2440 IF U$ = "LB" THEN MM = 1
2450 IF U$ = "TON" THEN MM = 0.0005
2460 M=1/mm
2470 RETURN
```

In cited example, conversions sections, feet, pounds, and pounds per square inch were selected as tee basic (unity) program unitfactors. Should a program require inches rather than feet, the factor of 12 need be entered into the program formulae only once. Subsequently, all input and output unitfactors would be corrected accordingly. However, nothing precludes conversion sections set up in terms of any desired dicipline unitfactor.

It is emphasized, the user of said program would have no knowledge of formulae utilized as in program line 1420, or program line 1500, "3.1416", or program line 1500 "½".

ADAPTIVE FIELD OF USE

A program of said invention process could be vital to an operator or user for comparative information and selected characteristics of 10 year old children for all nations. The sundry data with the many different unitfactors could be entered into said program with no operator or user concern. In fact, he could very well be unfamiliar with many of the unitfactors. Each user of said invention program could likewise call for his analysis output data in unitfactors of his own understanding.

FUTURATIVE

It is envisioned that much of the material as it no exists in reference books, hand books, text books and other works of an analytical nature, will be converted to computer programs of sundry types. Integration with the invention described herein enhances the value of said programs many fold; both saving time, and reducing errors.

Various modifications, of course, can be made without departing from the spirit of this invention or the scope of the appended claims. It is understood that many variations are possible which will yield a process as disclosed herein. The programs set forth in this disclosure are given as examples and are in no way final or binding.

I claim:

1. A method of entering and retrieving a function input and output data in a device comprising a programmable computer under the control of an operating system and said function, without the use of conversion factors, universal constants or analytical operators, the method comprising:

storing a plurality of predetermined functions in a program storing means;

selecting, via an alphanumeric keyboard, one of said plurality of functions;

displaying the selected function on a video display;

querying the operator, through said video display, for the necessary input data;

entering, via said alphanumeric keyboard, input data in response to said queries, the input data having a data format comprising a numeric value and a unitfactor; said unitfactor being selected from a limited plurality of unit factor symbols as defined on said video screen of said device; said unitfactors and their symbols being those most applicable to the discipline of said selected function and independent to the symboling of the other predetermined functions;

said device converting said input data into a compatible internal data format, said internal data format having a numeric value and an unitfactor which is equivalent to said input data;

determining, via said device a result of the selected function, using data in said internal data format;

storing the result of the selected function in said internal data format;

querying the operator, through said video display, for a desired output data format;

selecting, via said alphanumeric keyboard, said desired output data format, said output data format having a numeric value and an unitfactor which is equivalent to said internal data format; said unitfactor being selected form a limited plurality of unitfactor symbols as defined on said video screen; said unitfactors and their symbols being those most applicable to the discipline of said selected function and independent to the symbology of the other said predetermined functions;

said device converting said internal data format into the equivalent output data format; and outputting the output data format onto an output means.

* * * * *